W. H. MARSEE.
CUTTER BAR.
APPLICATION FILED DEC. 10, 1902.
NO MODEL.
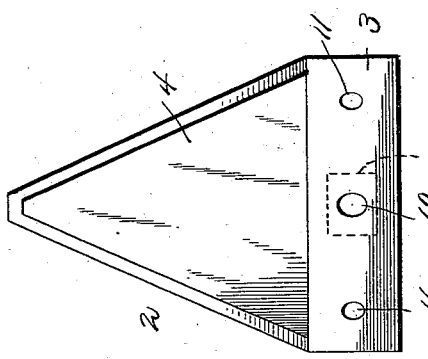
FIG. 2.
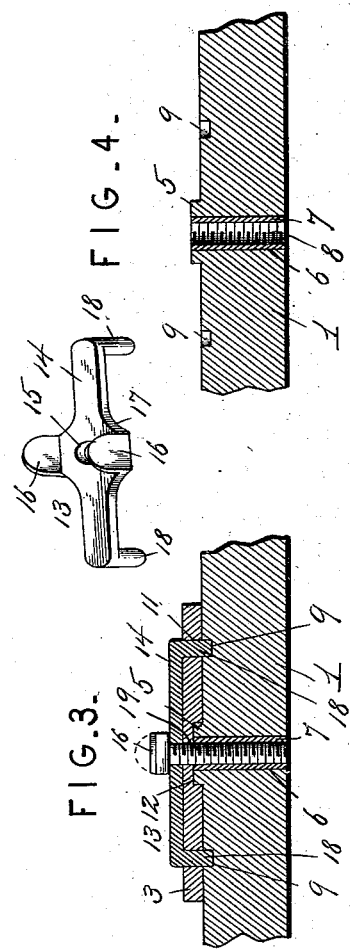
FIG. 4.
FIG. 5.
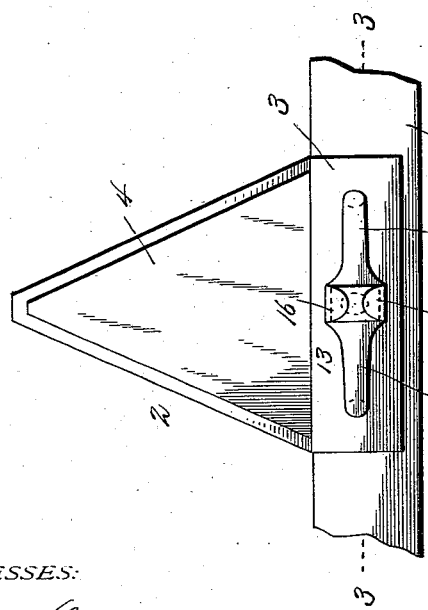
FIG. 1.
FIG. 3.
WITNESSES:
Harry L. Amer.
Chas. S. Hyer.
INVENTOR
William H. Marsee.
BY Victor J. Evans Attorney

UNITED STATES PATENT OFFICE.

WILLIAM H. MARSEE, OF FONTAINBLEAU, MISSOURI.

CUTTER-BAR.

SPECIFICATION forming part of Letters Patent No. 723,697, dated March 24, 1903.

Application filed December 10, 1902. Serial No. 134,694. (No model.)

*To all whom it may concern:*

Be it known that I, WILLIAM H. MARSEE, a citizen of the United States, residing at Fontainbleau, in the county of Andrew and State of Missouri, have invented new and useful Improvements in Cutter-Bars, of which the following is a specification.

This invention relates to cutter-bars or sickles for mowing and reaping machines, and has for its object to enable the cutters of the bar to be readily removed and applied, so that broken knives can be withdrawn and replaced by new ones or detached for the purpose of sharpening the same and afterward reapplied without the use of special tools or the need of skilled workmen, thus permitting a cutter-bar or sickle to be immediately repaired in the event of breakage of any of the cutters by an owner of the machine on which said bar or sickle is used with material advantage in maintaining mowing or reaping machines in practical working condition.

The invention consists in the construction and arrangement of the several parts, which will be more fully hereinafter described and claimed.

In the drawings, Figure 1 is a top plan view of a portion of a cutter-bar or sickle, showing a cutter thereon held by the improved securing means. Fig. 2 is a top plan view of the cutter, showing the construction thereof to receive the improved securing means. Fig. 3 is a longitudinal vertical section on the line 3 3, Fig. 1. Fig. 4 is a longitudinal vertical section of a part of the bar. Fig. 5 is a detail perspective view of the securing-clip.

Similar numerals of reference are employed to indicate corresponding parts in the several views.

The numeral 1 designates a cutter or sickle bar, which will be equipped in practice with the usual fingers and has disposed thereon at regular intervals cutters 2 of the usual contour and comprising attaching members 3 and blades 4. On the upper surface of the bar, at the point where each cutter engages therewith, an upstanding rectangular boss 5 is formed, and therethrough and through the bar 1, directly below the same, an opening 6 is constructed and supplied with a bushing 7, having interior screw-threads 8. At equal distances from opposite ends of the boss 5 the upper side portion of the bar 1 is formed with sockets 9. The attaching member 3 of the cutter has an opening 10 at the center thereof and opposite smaller openings 11 near the ends of the same, the openings 10 and 11 being adapted to respectively coincide with the bushing 7 and the sockets 9. The under side of the attaching member 11, around the opening 10, is constructed with a recess 12, having dimensions sufficiently large to permit the boss 5 to project upwardly thereinto, the vertical extent of the recess 12 and the boss 5 being such that when the attaching member 3 of the cutter is disposed on the upper surface of the bar 1 the said member of the cutter will closely bear against the upper surface of the bar 1.

A fastening-clip 13 is used for securing the cutter 2 on the bar 1 and is clearly shown by Fig. 5. This clip comprises an elongated rigid bar 14, transversely extended at the center to provide a widened bearing-surface 17 at the center, having normally upstanding bendable ears 16 at opposite sides, and through the center of the bearing-surface 17, between the ears 16, an opening 15 is formed. The opposite ends of the bar 14 have depending pins or studs 18.

The cutter 2 is placed on the bar 1, with the member 3 engaging the boss 5 and the openings 11 coinciding with the sockets 9. The clip 13 is then disposed on the upper side of the member 3, and the pins or studs are pushed through the openings 11 into the said sockets 9. The screw-bolt 19 is then inserted through the openings 17 and 10 of the clip and member 3 and rotated to cause the threads thereof to engage the threads of the bushing 8, the rotation of the bolt being continued until the head of the same bears snugly against the surface 15 of the clip and the ears 16. The bolt is proportioned as to its length relatively to the parts it engages in such manner that when the head thereof closely bears on the surface 15 the opposite edges of said head will be in parallel relation to the inner face of the ears 16; and the latter are then struck inwardly or upset over the upper side of the head to thereby prevent the bolt from turning and securely holding the clip in applied position and maintaining the cutter in positive immovable relation to the bar 1. When it is desired to detach the cutter, a cold-chisel or other implement is driven under the upset ears 16 to raise the same and clear the head of the bolt 19, when the latter may be withdrawn and the clip and cutter removed from the bar 1. In replacing the broken cutter the same clip may be used, as it is proposed to construct all the cutters alike to accommodate securement thereof by the improved means heretofore set forth.

Having thus fully described the invention, what is claimed as new is—

1. The combination of a cutter-bar having a boss rising therefrom and an opening through said boss and the bar below the same and also provided with sockets at equal distances from the opposite ends of the boss, a cutter having a central opening and other openings in alinement with and at a distance from said central opening, and a recess around the central opening to receive the boss, a clip with downwardly-extending terminal studs, a central opening, and oppositely-disposed central ears, the studs of the clip being inserted through the openings in the cutter adjacent the ends of the latter and projecting into the said sockets, and a securing screw-bolt inserted through the clip, the central opening in the cutter, and the opening in the boss and bar and adapted to have the ears upset over the head thereof.

2. The combination of a cutter-bar having a boss rising therefrom and an opening therethrough and through the boss, and sockets at equal distances from the opposite ends of the boss, a cutter having openings therethrough adjacent the ends and a recess to receive the boss, a clip having terminal studs to pass through the openings in the cutter and engage the sockets, and a screw-bolt inserted through the center of the clip and the cutter and secured in the bar and boss, the head of the bolt removably engaging the upper surface of the clip.

In testimony whereof I affix my signature in presence of two witnesses.

WILLIAM H. MARSEE.

Witnesses:
JOHN W. FARRELL,
FRANK FARRELL.